United States Patent
Suzuoka et al.

[11] Patent Number: 6,055,535
[45] Date of Patent: Apr. 25, 2000

[54] INFORMATION RETRIEVING METHOD AND APPARATUS

[75] Inventors: Takashi Suzuoka, Kanagawa-ken; Nobuyuki Sawashima, Tokyo; Tetsuya Yamane, Tokyo, all of Japan

[73] Assignee: Kabushiki Kaisha Toshiba, Kawasaki, Japan

[21] Appl. No.: 09/033,646

[22] Filed: Mar. 3, 1998

[30] Foreign Application Priority Data

Mar. 3, 1997 [JP] Japan ..................................... 9-047900

[51] Int. Cl.[7] ....................................................... G06F 17/30
[52] U.S. Cl. ............................................. 707/10; 707/102
[58] Field of Search ....................................... 707/10, 102

[56] References Cited

U.S. PATENT DOCUMENTS

| | | |
|---|---|---|
| 5,548,770 | 8/1996 | Bridges . |
| 5,551,027 | 8/1996 | Choy et al. . |
| 5,694,594 | 12/1997 | Chang ............................................. 707/6 |
| 5,864,855 | 1/1999 | Ruocco et al. ............................. 707/10 |
| 5,864,863 | 1/1999 | Burrows ................................... 707/103 |
| 5,867,799 | 2/1999 | Lang et al. ................................... 707/1 |
| 5,870,746 | 2/1999 | Knutson et al. ......................... 707/107 |
| 5,873,076 | 2/1999 | Barr et al. ................................... 707/3 |
| 5,915,249 | 6/1999 | Spencer ....................................... 707/5 |

*Primary Examiner*—Wayne Amsbury
*Attorney, Agent, or Firm*—Oblon, Spivak, McClelland, Maier & Neustadt, P.C.

[57] ABSTRACT

Terms are extracted from a document as a retrieval subject, and weights of the respective terms in the document are set. In assigning data to a plurality of retrieving apparatuses in accordance with the weights thus set, weight ranges are determined so as to avoid overlap or omission in terms as subjects of the retrieving apparatuses, and evaluation value ranges are determined according to a given evaluation formula so as to correspond to the respective weight ranges. Searches are performed in descending order of evaluation values that are obtained according to the evaluation formula.

9 Claims, 11 Drawing Sheets

0th level
(6 < WEIGHT ≦ 9)

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 |   |   |   |   |   |   | 9 |   |   |   |    |    |    |
| 1 |   |   |   |   |   |   |   |   |   |   |    |    |    |
| 2 |   |   |   |   |   |   |   |   |   |   |    |    |    |
| 3 |   |   |   |   |   |   |   |   |   |   |    |    |    |
| 4 |   |   |   |   |   |   |   |   |   |   | 8  |    |    |
| 5 |   |   |   |   |   |   |   | 7 |   |   |    |    |    |

FIG.3A

-1st level
(3 < WEIGHT ≦ 9)

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 |   |   |   |   |   |   | 9 |   | 4 |   |    |    |    |
| 1 |   |   |   |   |   |   |   |   |   |   |    |    |    |
| 2 |   |   |   |   |   |   |   |   |   | 4 |    |    | 6  |
| 3 |   |   |   |   |   |   |   |   |   | 5 |    |    |    |
| 4 |   | 5 |   |   |   |   |   |   |   |   | 8  |    |    |
| 5 |   |   |   |   |   |   |   | 7 |   |   |    |    |    |

FIG.3B

2nd level
(0 < WEIGHT ≦ 9)

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 |   |   | 1 |   |   |   | 9 |   | 4 |   |    | 2  |    |
| 1 | 3 |   |   |   |   | 1 |   |   |   |   |    |    |    |
| 2 |   |   | 1 | 1 | 2 |   |   | 2 |   | 4 |    |    | 6  |
| 3 |   |   |   |   |   |   | 3 |   | 1 |   | 5  |    |    |
| 4 |   | 5 |   |   |   |   | 3 | 1 |   |   | 8  |    |    |
| 5 | 1 |   |   | 2 |   |   |   | 7 |   |   |    |    | 1  |

FIG.3C

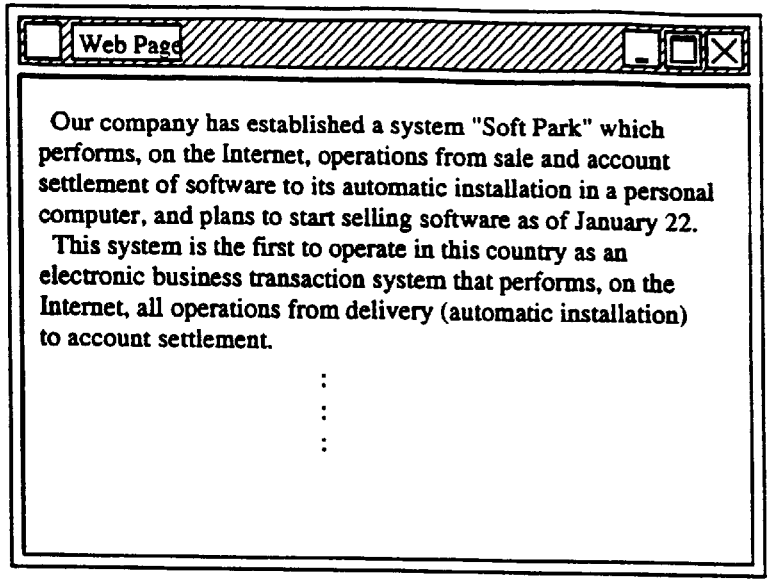

Our company has established a system "Soft Park" which performs, on the Internet, operations from sale and account settlement of software to its automatic installation in a personal computer, and plans to start selling software as of January 22.
This system is the first to operate in this country as an electronic business transaction system that performs, on the Internet, all operations from delivery (automatic installation) to account settlement.

FIG.4A

Our company, establish, system, Soft Park,
perform, Internaet, operation, sale, account,
settlement, software, automatic, installation, personal
computer, plans, start, sell, software, January 22,
system, first, operate, this country,
electronic, business, transaction, system, performs,
Internet, operations, delivery, automatic, installation
account, settlement.

FIG.4B val(1, document123) = 1
val(22, document123) = 1
val(installation, document123) = 9
val(Internet, document123) = 10
val(system, document123) = 5
val(software, document123) = 5
val(Soft Park, document123) = 7
val(personal computer, document123) = 8
val(operate, document123) = 4
val(start, document123) = 2
val(establish, document123) = 3

FIG.4C

RETRIEVING APPARATUS S0: SEARCH RANGE(7, 10]
   {Internet, (123, 10)}
   {installation, (123, 9)}
   {personal computer, (123, 8)}

FIG.5A

RETRIEVING APPARATUS S1: SEARCH RANGE(4, 10]
   {Internet, (123, 10)}
   {installation, (123, 9)}
   {personal computer, (123, 8)}
   {Soft Park, (123, 7)}
   {settlement, (123, 7)}
   {business transaction, (123, 7)}
   {account, (123, 7)}
   {electronic, (123, 6)}
   {sell, (123, 6)}
   {system, (123, 5)}
   {software, (123, 5)}
   {our company, (123, 5)}

FIG.5B

RETRIEVING APPARATUS S2: SEARCH RANGE($-\infty$, 10]
   {Internet, (123, 10)}
   {installation, (123, 9)}
   {personal computer, (123, 8)}
   {Soft Park, (123, 7)}
   {settlement, (123, 7)}
   {business transaction, (123, 7)}
   {account, (123, 7)}
   {electronic, (123, 6)}
   {sell, (123, 6)}
   {system, (123, 5)}
   {software, (123, 5)}
   {our company, (123, 5)}
   {operate, (123, 4)}
   {this country, (123, 4)}
   {establish, (123, 3)}
   {first, (123, 3)
   {automatic, (123, 3)}
   {delevery, (123, 3) }
   {start, (123, 2)}
   {month, (123, 2)}
   {day, (123, 2)}
   {1, (123, 1)}
   {22, (123, 1)}
          :
          :

FIG.5C

{Internet, (39, 10), (99, 9), (123, 10), (208, 8), (1023, 8)}
{installation, (10, 9), (39, 8), (123, 9), (224, 10), (998, 8)}
{personal computer, (19, 8), (120, 8), (123, 8), (324, 9), (867, 10)}
{Intranet, (19, 8), (108, 8), (478, 10), (556, 9), (740, 9), (876, 8)}
{Ethernet, (19, 9), (40, 9), (99, 10), (459, 9), (652, 8), (1023, 8)}

FIG.6

INFORMATION RETRIEVING METHOD AND APPARATUS

BACKGROUND OF THE INVENTION

1. Field of the Invention

The present invention relates to an information retrieving method and apparatus, and, more particularly, to a method and apparatus for performing a full-text search on document data having a large volume.

2. Description of the Background Art

Using a word-based full-text search is known as a method for retrieving, at high speed, documents desired by a user. In this retrieving method, a document that is a subject of search and retrieval is decomposed into words in advance by a morphological analysis or the like, and then a database (typically containing indices) for examining a relationship between the words and the document is constructed. The database is searched for a word that is desired by a user.

In particular, when the amount of documents is very large, a single computer may be incapable of high-speed processing, and thus ineffectively performs. A common method for solving this problem is to arrange the retrieving apparatuses in a distributed array.

A common dividing method is to divide a retrieving apparatus according to keys, which are one of term (or word) identifiers and document identifiers. The former are used for dividing the retrieving apparatus by terms and the latter are used for dividing the retrieving apparatus by documents.

When term identifiers are used as keys, each term is concentrated in a single retrieving apparatus but each document is distributed over a plurality of retrieving apparatuses. Therefore, when a search is made with respect to a single term, (e.g., term A), only a retrieving apparatus containing that term is used, and hence the load on the retrieving apparatus is light. However, when searching for documents that contain two terms A and B that are not assigned to a single retrieving apparatus, there arises a problem that a transfer of a large amount of information occurs between two retrieving apparatuses to thereby extremely reduce the search speed.

Specifically, when apparatus division is made by using term identifiers as keys, if not all of terms appearing in a search formula are assigned to a single retrieving apparatus, an information transfer occurs between the related retrieving apparatuses. For example, consider a retrieval request for "Internet AND personal computer." If the terms "Internet" and "personal computer" are held by different retrieving apparatuses, an information transfer is needed between the two apparatuses to execute the AND function. That is, a retrieving apparatus that has searched for "Internet" must transfer retrieval results to the other retrieving apparatus that holds the term "personal computer," or vice versa.

On the other hand, in the method of using document identifiers as keys, one document is concentrated in one retrieving apparatus but the same term is distributed over a plurality of retrieving apparatuses. Therefore, it is necessary to use all retrieving apparatuses even for a search for one term. Obtaining results produced by the total system of retrieving apparatuses is problematic, because it is necessary to collect and arrange results of all the retrieving apparatuses.

Specifically, when apparatus division is made by using document identifiers as keys, an information transfer may occur due to a different reason than in the above example. That is, there arises a problem that each retrieving apparatus cannot determine what number of retrieval results it should collect in its search range. For example, for a request for the 100 highest-rank (in terms of evaluation value) retrieval results that satisfy "Internet AND personal computer," each retrieving apparatus cannot determine a specific number of retrieval results it should collect. Therefore, each retrieving apparatus sends the 100 highest-rank retrieval results it has produced to a controller (for instance, a central management apparatus), and the controller sorts the retrieval results received from retrieving apparatuses by the evaluation value and disregards retrieval results whose ranks among all the received retrieval results are lower than the 100th rank. This means that the transfers of the disregarded retrieval results are unnecessary.

Additionally, each of the above-described two methods does not sufficiently consider the output order of retrieval results according to evaluation values. That is, each method requires outputting retrieval results according to an evaluation formula that is derived from a search formula so as to reflect it in a faithful manner. In determining an evaluation formula, it is important that it be suitable for the user. Although the processing speed can be increased by generating an evaluation formula that is favorable for implementation, an evaluation formula contrary to the user's intuition is difficult for the user to accept.

For example, consider a case where a first retrieving apparatus searches documents in which the weight of a term is 0.5 or more and a second retrieving apparatus searches documents in which the weight of a term is smaller than 0.5. In making a search for "Internet AND personal computer," the first retrieving apparatus searches documents in which the weights of both terms are 0.5 or more. Retrieval results are sorted so as to be arranged in order of the sum of the weights of the two terms and then output in the order thus determined. Next, retrieval results that have not been produced by the first retrieving apparatus (i.e., documents in which the weight of one of the two terms is smaller than 0.5) are sorted so as to be arranged in order of the sum of the weights and then output in the order thus determined. In this case, because of the evaluation scheme according to the sum of the weights of the terms, a document in which the weights of the terms "Internet" and "personal computer" are 1.0 and 0.49, respectively, has a higher rank than a document in which the weights of both terms are 0.5. However, since the former document is searched for by the second retrieving apparatus and the latter document is searched for by the first retrieving apparatus, the retrieval results of the latter document are output first.

As exemplified above, users intuitively feel an evaluation formula that is not continuous at boundary lines between retrieving apparatuses is unnatural. Therefore, an evaluation formula is desired to be continuous at each boundary line between adjacent ones of hierarchical retrieving apparatuses.

SUMMARY OF THE INVENTION

An object of the present invention is to provide an information retrieving method which minimizes unnecessary information transfers and thereby enables a high-speed information search on a distributed database.

The present invention enables a high-speed full-text search on a document-based distributed database because it reduces unnecessary information transfers.

According to the present invention, there may be no overlap between the search ranges of the respective retrieving apparatuses, and thus there occurs no overlap between retrieval results produced by the respective retrieving apparatuses. By arranging retrieval results of the respective retrieving apparatus in order, all retrieval results can be presented in order of evaluation values. For example, where a retrieving apparatus of a smaller number covers a larger evaluation value range as described above, retrieval results that have no omission or overlap and are sorted by the evaluation value can be obtained by simply arranging retrieval results produced by the respective retrieving apparatus in ascending order of the retrieving apparatus numbers. By virtue of the fact that there is no overlap in retrieval results, useless operations such as an overlap judgment and a communication between retrieving apparatuses required by occurrence of an overlap are no longer necessary.

The present invention allows each retrieving apparatus to perform a search completely independently of the other retrieving apparatuses because each retrieving apparatus is assigned its own search range in advance.

Further, the present invention realizes more efficient searches by a controller's control of the number of retrieval results and a cache device.

BRIEF DESCRIPTION OF THE DRAWINGS

FIGS. 3A to 3C show index tables of 0th to 2nd hierarchical levels, respectively, of an embodiment of the present invention;

FIG. 4A shows an example of document data;

FIG. 4B shows an example of a result of a morphological analysis on the document data of FIG. 4A;

FIG. 4C shows an example of weighting of the result of FIG. 4B;

FIGS. 5A to 5C show examples of data assigned to respective retrieving apparatuses by hierarchical levels;

FIG. 6 shows an example of data assigned to a retrieving apparatus S0;

DETAILED DESCRIPTION OF THE PREFERRED EMBODIMENTS

Figure 1:
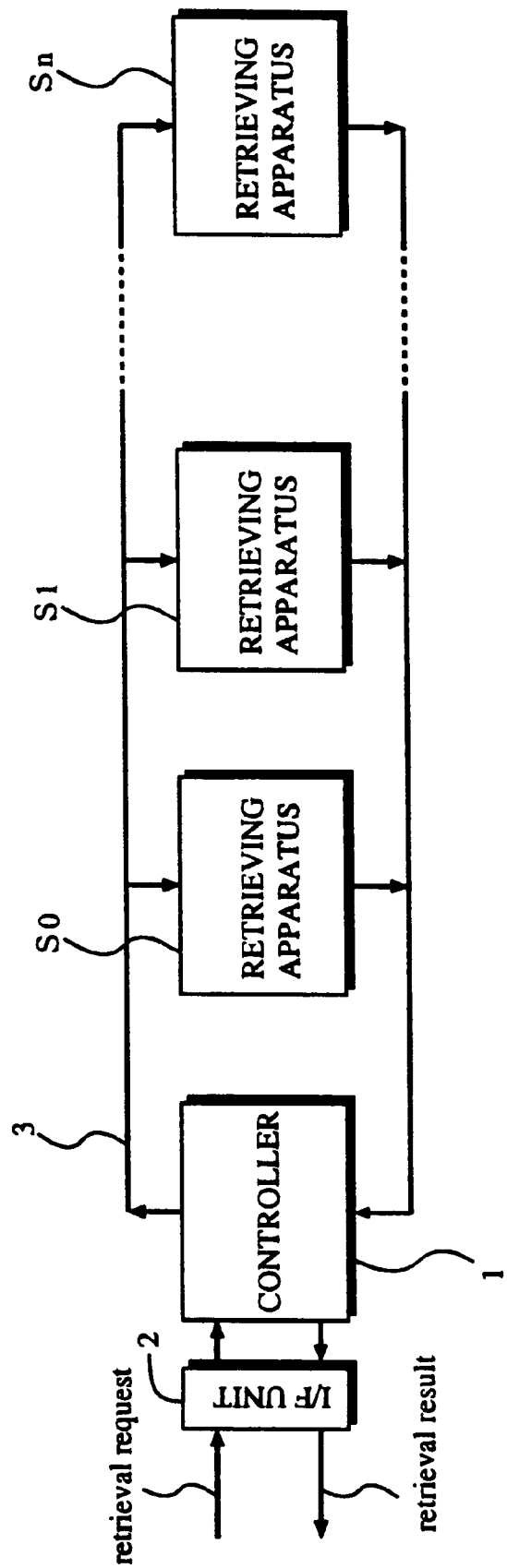
FIG. 1 shows a system configuration of an information retrieving apparatus according to the present invention.

The embodiments of an information retrieving method and apparatus according to the present invention are hereinafter described in detail with reference to the accompanying drawings.

The terms used in the description of the preferred embodiments are defined as follows:

Document: A string of arbitrary digitized data (digital data) that can be processed by a computer. It may be a document written in natural language and is digitized data, or source codes or an object of a program. It also may be an image, a moving image, or sound.

Term (or word): Arbitrary digital data. It may be, for example, a term or word of a natural language, a binary code word, or an operation code of an instruction to be given to a central processing unit (CPU). It may be extracted and/or obtained through decomposition from a document.

val(term A, document i): The weight of term A in document i. In one embodiment of the present invention, it is smaller than or equal to a value given by a system. Under this condition, it can be defined arbitrarily. Although it is defined by the following formulae in the embodiments described herein, the present invention is not limited to such a case:

val(term A, document i) g(freq(term A, document i)+wo (term A)+do(document i))

freq(term A, document i)=(frequency of occurrence of term A in document i)

wo(term A)=(degree of importance of term A (a term that is used more frequently in searches has a larger value, and a term that appears at a higher frequency irrespective of the document has a smaller value))

do(document i)=(degree of importance of document I (a more popular document has a larger value))

g(x)=(monotonically increasing function having an upper bound or a least upper bound)

(low, high]: This means a range greater than a numerical value "low" and less than or equal to a numerical value "high." That is, this range does not include "low" but includes "high."

Number p of terms: The number of terms appearing in a search formula except ones that are operands of NOT. Examples are as follows:

Internet . . . p=1

Internet AND personal computer . . . p=2

Internet AND (personal computer OR word processor) . . . p=3

Internet AND personal computer NOT word processor . . . p=2

Internet AND personal computer NOT (word processor OR software) . . . p=2.

Index table: A table that is generated from original information (see FIG. 3A below) so that information associated with a certain key can be retrieved based on the key. FIG. 3B shows an example of original information, and FIG. 5 shows an example of an index table, which is a table to be used for searching for the document number of a document including a key term and the weight of that term in the document.

NOT: "Weak NOT" is used in one embodiment of the present invention. For a full-text search, a search scheme that eliminates from the subjects of search a document having a term designated by NOT that appears at least once is too strict to be used conveniently. For example, consider the following search:

Personal computer NOT word processor.

A document including a sentence "A personal computer rather than a word processor is necessary" is not retrieved even though it should be. Accordingly, in one embodiment of the present invention, although it avoids, if possible, including in retrieval results a document including a term designated by NOT, such a document is included in the retrieval results if the evaluation values of other terms are large.

To realize the above search scheme, when a certain document lacks a term that is designated by NOT at a certain hierarchical level, a process is executed with an assumption that the term designated by NOT has a small evaluation value in the document. That is, no inquiry is made to lower hierarchical levels to perform a complete search for NOT. For example, when "word processor" is designated as a keyword, it is desired that this document not be searched for by using a search formula " . . . NOT word processor." Since "word processor" has a large evaluation value in this document, using "weak NOT" prevents this document from being searched for in an inappropriate manner.

Next, a first embodiment of the present invention is described in detail.

FIG. 1 shows a system configuration of an information retrieving apparatus according to the present invention. The information retrieving apparatus comprises a controller 1, an interface (I/F) unit 2, an information transfer line 3, and a plurality of retrieving apparatuses S0 to SN-1. The controller 1 receives a first retrieval request via the interface unit 2 that is connected to a network (not shown) or the like. The controller 1 sends second retrieval requests to respective retrieving apparatuses S0 to SN-1 (hereinafter "retrieving apparatuses S (or Si)") via the information transfer line 3.

Figure 2:
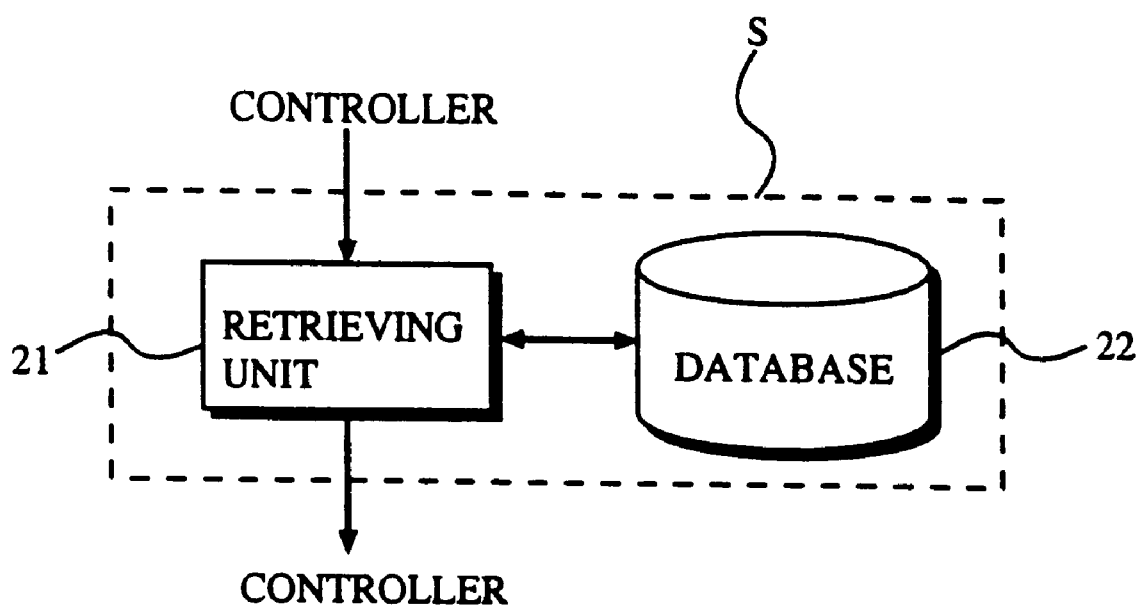
FIG. 2 shows the configuration of each retrieving apparatus of the information retrieving apparatus of FIG. 1.

FIG. 2 is a block diagram illustrating a receiving apparatus S according to the present invention. The receiving apparatus S includes a receiving unit 21 and a database 22. Based on the received retrieval request from the controller 1, the retrieving unit 21 in each retrieving apparatus S performs a prescribed search on the database 22, and the retrieving apparatus S sends retrieval results to the controller 1.

The database 22 is hierarchically divided into search ranges covered by the respective retrieving apparatuses Si. The database 22 may be divided either logically or physically.

The retrieving apparatus Si is in charge of those data of the database 22 in which the weight (determined by the function "val" that has a term and a document as arguments) of a term is larger than an element $t[i]$ of an array $t$. The elements of the array $t$ have the following values:

$t[i] > t[i+1], 0 \leq i < N-1$ $t[0] = MAX$ $t[N-1] = -\infty$

Therefore, if $i<j$, the information of the retrieving apparatus Si is a subset of the information of the retrieving apparatus Sj.

FIGS. 3A to 3C illustrate the hierarchical division of the database 22, and particularly show index tables that constitute the database 22 that is divided into three hierarchical levels, e.g., the 0th level to the 2nd level. Each index table includes documents and terms and is configured so that the vertical axis is assigned documents as search subjects and the horizontal axis is assigned terms as search keys. Each intersection in the index table is given the weight of a term.

Each retrieving apparatus S is assigned a hierarchical level to be searched by itself, and is given the greatest lower bound of weight values of terms to be covered by itself. In the present invention, the greatest lower bound of a retrieving apparatus Si is set larger than the greatest lower bound of a retrieving apparatus Si+1. Consequently, the search subject data of the lower-level retrieving apparatus Si+1 include those of the higher-level retrieving apparatus Si.

Specifically, FIGS. 3A to 3C show an example in which index tables of 6 documents and 13 terms are generated by using retrieving apparatuses that are assigned to three levels. In this example, weight values take values 0 to 9 and blanks indicate that the weight value is 0. More specifically, the 0th-level retrieving apparatus searches data whose weight values are larger than 6, the 1st-level retrieving apparatus searches data whose weight values are larger than 3, and the 2nd-level retrieving apparatus searches all data.

FIGS. 4A–4C show an example of a document, the morphological analysis of such document and the weighting, respectively. More particularly, FIG. 4A shows an illustrative document. FIG. 4B shows a result of a morphological analysis of the document of FIG. 4A. FIG. 4C shows the result of weighting of the result of FIG. 4B. In this example, the system is configured in three levels (N=3).

An array $t$ is defined as follows:

$t[0]=10, t[1]=7, t[2]=4, t[3]=-\infty$

FIG. 4A illustrates an illustrative document "123" ("123" is a document identifier in this embodiment) that is stored in retrieving apparatuses in the following manner:

(1) Terms are extracted and/or obtained through decomposition by performing a morphological analysis on the document "123." FIG. 4B shows an example of a result of the morphological analysis.

(2) The val function is applied to the results of the morphological analysis and weights of the respective terms in the document "123" are thereby determined. FIG. 4C shows an example of a result of weighting.

(3) The terms are assigned to the retrieving apparatuses according to the array $t$.

FIGS. 5A to 5C show examples of data obtained by assigning the terms to the retrieving apparatuses S by hierarchical levels of search ranges. The following format is used in FIGS. 5A to 5C:

{term, (document identification No., weight)}.

Terms are assigned to the retrieving apparatuses also for other documents in the same manner as for the document "123."

In this manner, a set of combinations of a term and a document number is obtained in each retrieving apparatus.

FIG. 6 shows an example of data assigned to the retrieving apparatus S0. Each data is expressed as a combination of a term, an identification number of a document including that term, and a weight of that term in the document.

{term, (document identification No., weight), . . . }

In FIG. 6, data of other documents are added in the retrieving apparatus S0; terms "intranet" and "ethernet" are newly added.

Figure 7A:
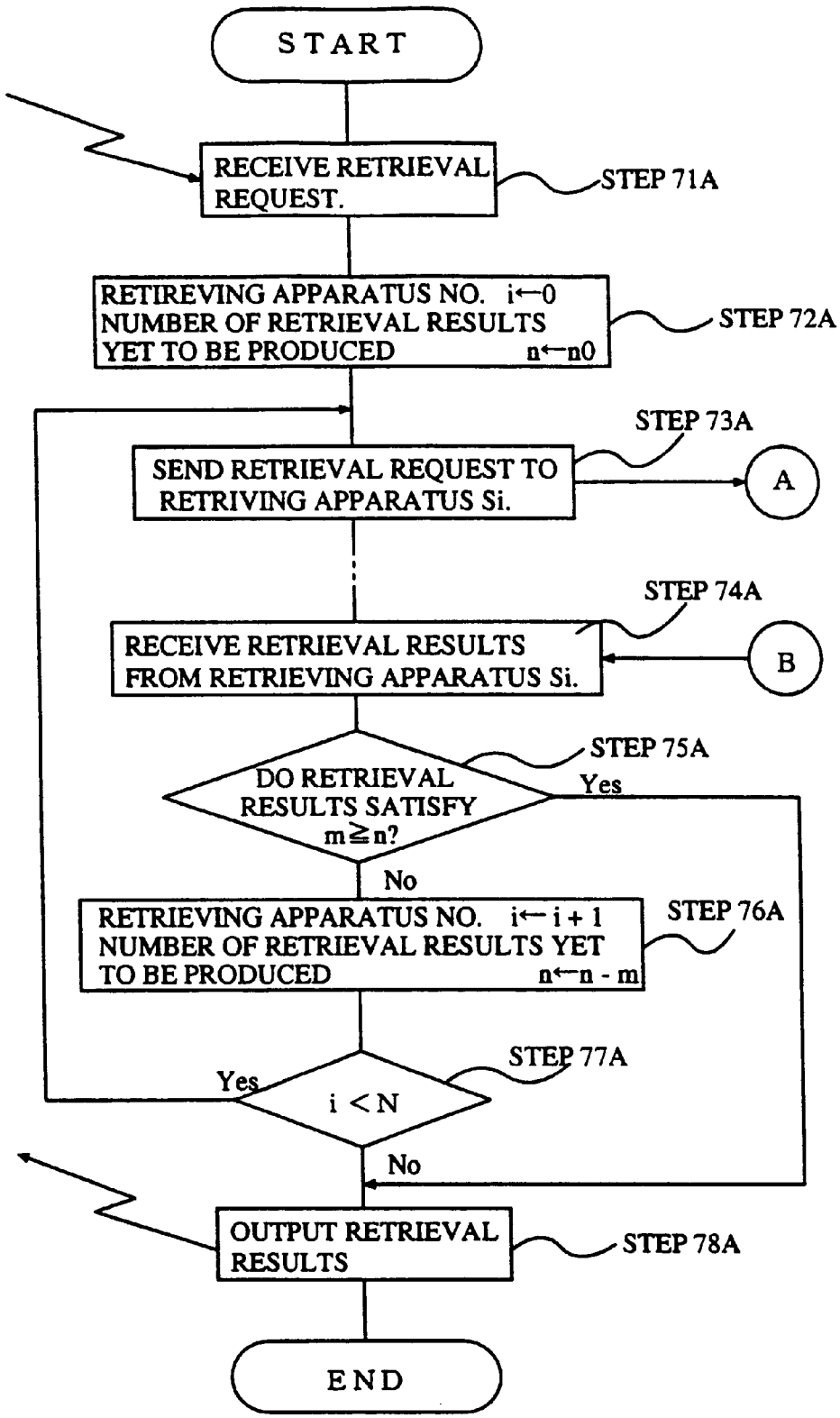
FIG. 7A is a flowchart showing a process executed by a controller of an embodiment of the present invention.
Figure 7B:
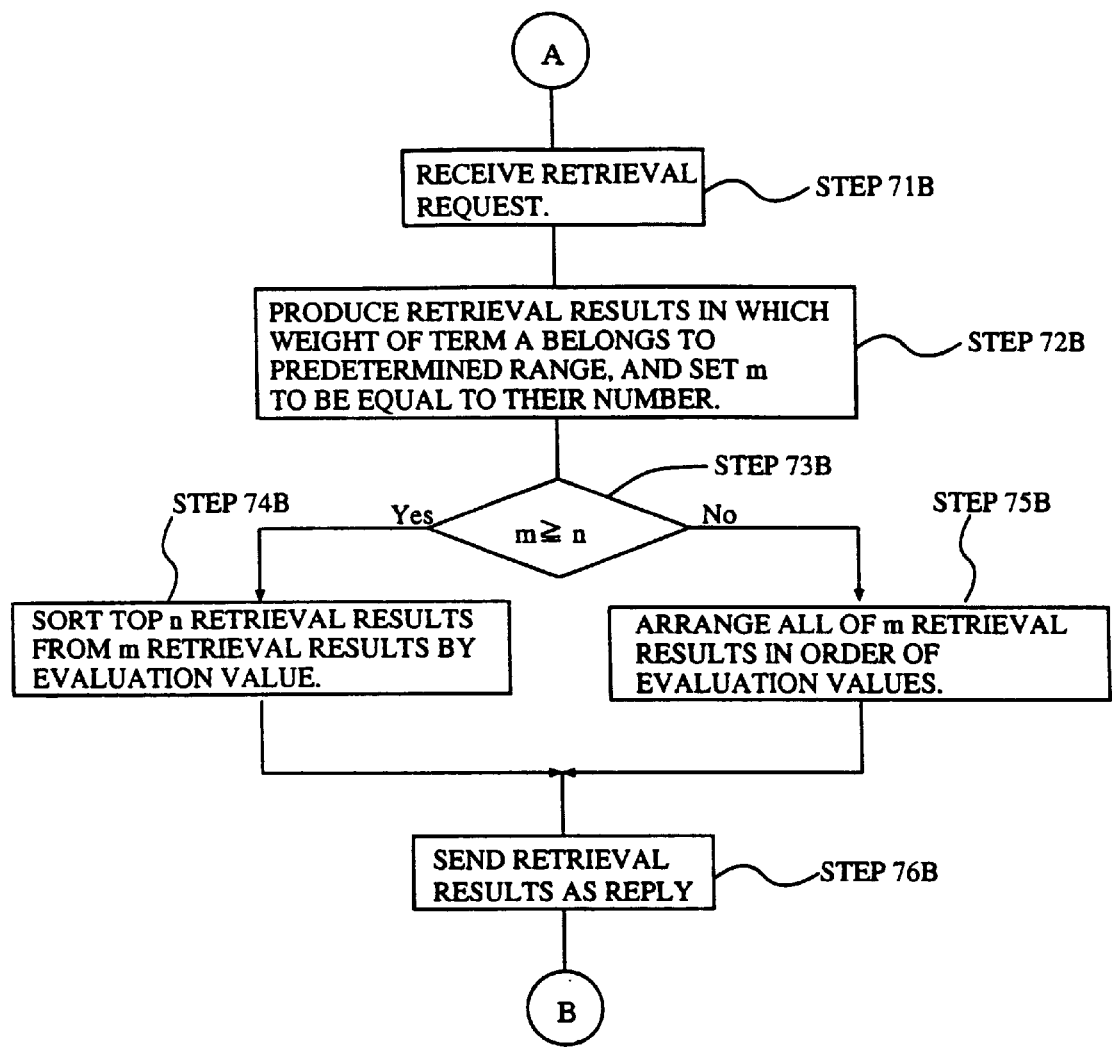
FIG. 7B is a flowchart showing a process executed by each retrieving apparatus of an embodiment of the present invention.

Next, the information retrieving method according to the present invention is described in detail with reference to FIGS. 7A and 7B. FIG. 7A shows a flow of a process of the controller 1 in this embodiment of the present invention, and FIG. 7B shows a flow of a process of each retrieving apparatus S in this embodiment of the present invention.

Referring now to FIG. 7A, at step 71A, the controller 1 receives a retrieval request. By way of example, it is assumed that the following retrieval request is given to the controller 1 at step 71A:

"Provide a number n largest evaluation value retrieval results of documents including term A."

As shown in FIG. 7A, at step 72A, the controller 1 initializes the retrieving apparatus number (No.) i to an initial value 0 and also initializes the number n of retrieval results yet to be produced to an initial value n0. At step 73A, the controller 1 requests the retrieving apparatus Si to produce the n largest evaluation value retrieval results for term A.

Referring now to FIG. 7B, upon reception of the retrieval request from the controller 1 at step 71B, the retrieving apparatus Si produces retrieval results in which the weight of term A belongs to the range (t[i+1], t[i]] and the retrieving apparatus Si sets a number m to be equal to the number of retrieval results at step 72B. At step 73B, the retrieving apparatus Si compares the number m with the number n of retrieval results yet to be produced. If the number m is greater than or equal to the number n at step 73B, the retrieval request from the controller 1 is satisfied. Therefore, the top n retrieval results are sorted from the m retrieval results by the evaluation value at step 74B and sent to the controller 1 as a reply at step 76B. On the other hand, if the number m is smaller than the number n at step 73B, all the produced retrieval results are sorted and arranged in order of weight values at step 75B and sent to the controller 1 as a reply at step 76B.

Referring again to FIG. 7A, upon reception of the retrieval results from the retrieving apparatus Si at step 74A, the controller 1 determines at step 75A, for the received retrieval results, whether the number m is greater than or equal to the number n. If the number m is greater than or equal to the number n at step 75A, the controller 1 outputs the retrieval results via the interface unit 2 at step 78A.

On the other hand, if it is determined at step 75A that the number m is smaller than the number n, at step 76A the controller 1 subtracts the number m (i.e., the number of retrieval results newly produced by the retrieving apparatus Si) from the number n (i.e., the number of retrieval results yet to be produced) and increments the retrieving apparatus number i by one to effect transition to the retrieving apparatus of the next level. The controller 1 determines whether the number i of the retrieving apparatus S is less than the total number N of retrieving apparatus (i(N). If there is another retrieving apparatus S that is managed by the controller 1, the process then returns to step 73A. On the other hand, if it is determined at step 77A that there remains no retrieving apparatus S that is managed by the controller 1, the retrieval results are output at step 78A, and the process is finished.

Next, a detailed description is made of how a search is performed by using a logical formula including AND (logical multiplication), OR (logical addition), and/or NOT (negation) when the information retrieving apparatus receives a retrieval request.

When such a logical formula is used, the information retrieving apparatus performs the following process as preprocessing:

(1) Only documents conforming to the search formula are extracted.

(2) In each of the extracted documents, the sum of weights of respective terms relating to the logical functions AND and OR is employed as an evaluation value corresponding to the search formula. In determining an evaluation value, no discrimination is made between AND and OR and terms relating to NOT are disregarded.

For example, assume the following search formula:

Internet AND personal computer.

In this case, documents including the terms "internet" and "personal computer" are searched for and sorted according to the following evaluation formula S:

S=val(Internet, document i)+val(personal computer, document i).

Now as another example, assume another search formula to search for documents that include the terms "internet" and "personal computer" but do not include the term "word processor":

Internet AND personal computer NOT word processor

First, only documents that satisfy the above condition are selected and then sorted by the evaluation value. Since terms relating to NOT should be disregarded in calculating evaluation values, an evaluation formula S used in this example is the same as in the previous example.

S=val(Internet, document i)+val(personal computer, document i)

Now, the number of terms relating to the operations other than NOT is represented by a parameter p, which is equal to 2 in this example. Then, the evaluation value range of the retrieving apparatus Si is set as follows:

$((p-1)t[0]+t[i+1],(p-1)t[0]+t[i]]$.

Figure 8A:
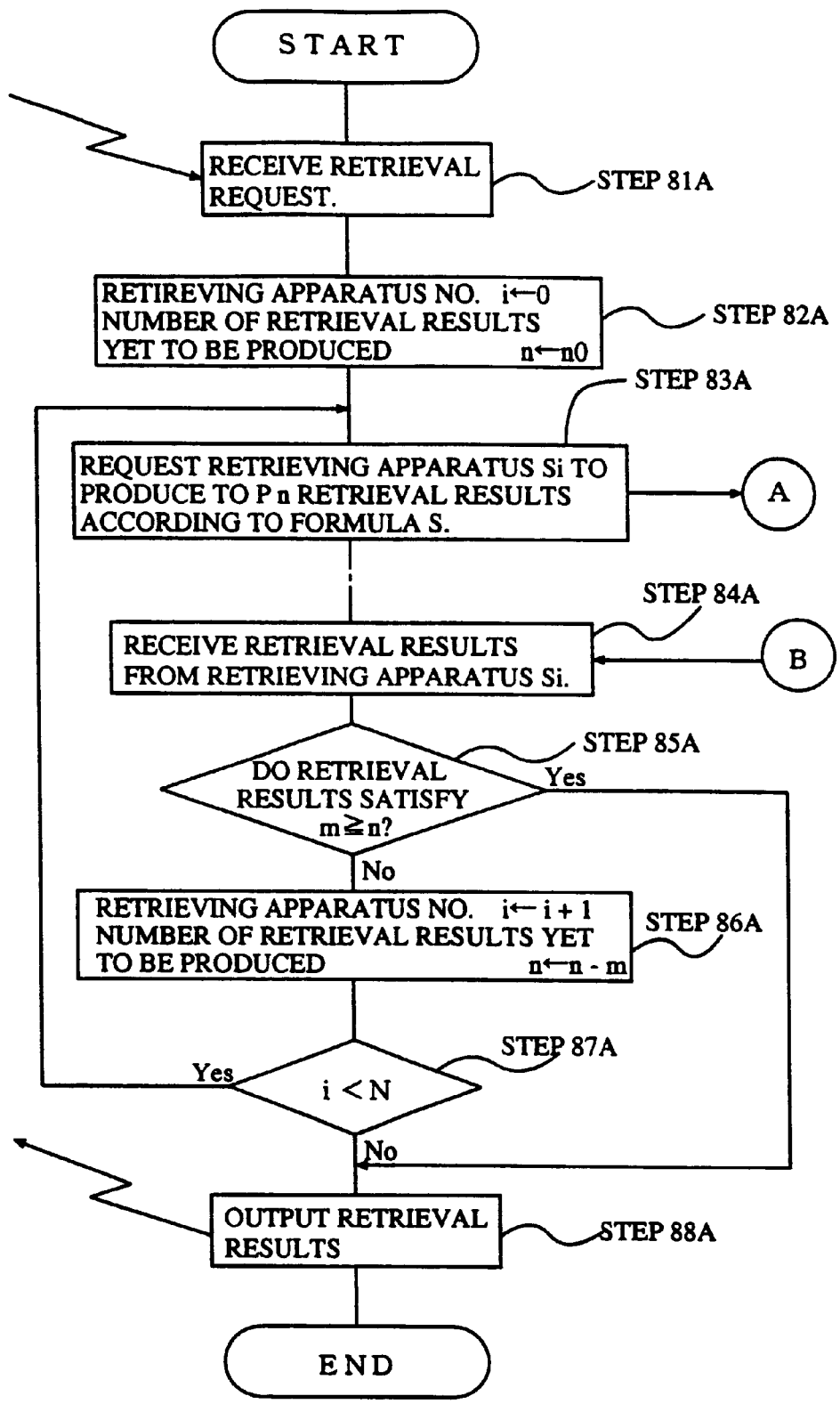
FIG. 8A is a flowchart showing a process executed by the controller of another embodiment of the present invention.
Figure 8B:
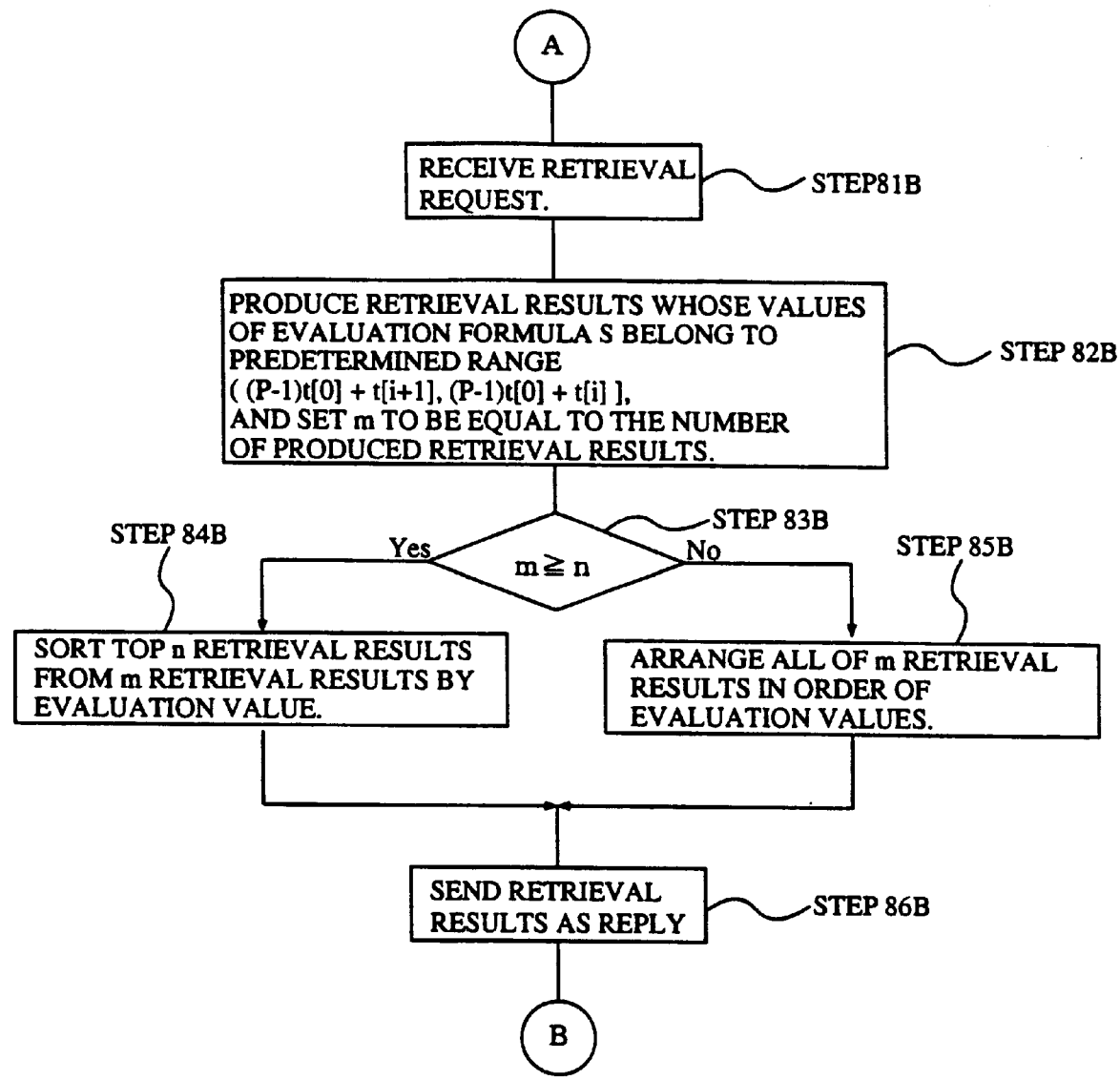
FIG. 8B is a flowchart showing a process executed by each retrieving apparatus of another embodiment of the present invention.

FIGS. 8A and 8B show a flow of a process executed by the information retrieving apparatus when a logical search formula is used. This process is the same as the process described above in connection with FIGS. 7A and 7B except step 82B of FIG. 8B that corresponds to step 72B of FIG. 7B. Specifically, steps 81A through 88A of FIG. 8A are identical to respective steps 71A through 78A of FIG. 7A, and steps 81B through 86B of FIG. 8B are identical to respective steps 71B through 76B of FIG. 7B, except corresponding steps 82B and 72B of respective FIGS. 8B and 7B.

That is, at step 82B, each retrieving apparatus S of the present invention searches for documents which satisfy the condition and in which values of the evaluation formula belong in the following range:

$((p-1)t[0]+t[i+1],(p-1)t[0]+t[i]]$.

Comparison between step 72B of FIG. 7B and step 82B of FIG. 8B shows that step 72B corresponds to a case where the number p of terms is equal to 1 in step 82B. That is, the search with respect to a single term shown in FIGS. 7A and 7B is a special case of the search with respect to a plurality of terms shown in FIGS. 8A and 8B.

So that no unnecessary communication occurs and that all retrieval results are obtained in correct order, the following two conditions, i.e., condition-1 and condition-2, should be satisfied. This embodiment of the present invention satisfies these conditions.

Condition-1: Retrieval results have no overlap.

In the present invention, this is always assured because the evaluation value ranges of the respective retrieving apparatuses have no overlap. Further, since a retrieving apparatus having a smaller number i has a larger evaluation range, retrieval results can be accumulated in descending order of evaluation values by collecting retrieval results from the retrieving apparatuses in ascending order of numbers i.

Condition-2: No retrieval results are omitted.

A document having a certain evaluation value should necessarily be recognized by one of the retrieving apparatuses. It may be conceivable that omission occurs in the following two cases.

Case 2-1: A document satisfying a search formula and appearing in a retrieving apparatus Si has an evaluation value larger than the evaluation value range of the retrieving apparatus Si, and retrieving apparatuses Sj(0(j<i) do not include that document.

Case 2-2: A document satisfying a search formula and appearing in a retrieving apparatus Si has an evaluation value smaller than the evaluation value range of the retrieving apparatus Si, and retrieving apparatuses Sj(i<j<N) do not include that document.

These two cases are now analyzed in view of this embodiment of the present invention. Case 2-1 does not occur in this embodiment of the present invention.

Although the maximum evaluation value of p terms in the retrieving apparatus Si is pt[0], if documents that have already appeared in retrieving apparatuses S0–Si-1 are excluded, the maximum evaluation value is $(p-1)t[0]+t[i]$. Therefore, there is no document that appears for the first time in the retrieving apparatus Si when searches are performed by the retrieving apparatus in ascending order of numbers i and that has a larger evaluation value than $(p-1)t[0]+t[i]$.

Case 2-2 also does not occur in this embodiment of the present invention. All the documents appearing in the retrieving apparatus Si are included in the retrieving apparatuses Sj (i<j<N). Since the retrieving apparatuses Sj perform searches down to $-\infty$ (negative infinity) while continuously decreasing the lower end of the evaluation value range, it is assured that a document that has not been picked up in the retrieving apparatus Si because of its small evaluation value is necessarily picked up by one of the retrieving apparatuses Sj.

Next, a second embodiment of the present invention is described.

In the above-described first embodiment, to simplify the description, the controller 1 always issues retrieval requests to the retrieving apparatuses S one by one in ascending order of their numbers (in descending order of their hierarchical ranks). In the second embodiment of the present invention, retrieval requests are issued in an arbitrary order.

One advantage of performing searches in ascending order of retrieving apparatus numbers is that no unnecessary communication occurs. When the retrieving apparatuses S receive many retrieval requests, it is necessary to effectively utilize the retrieving apparatuses S and information transfer lines 3 therebetween. To minimize unnecessary communication and processing, it frequently is favorable to perform searches in ascending order of retrieving apparatus numbers. However, causing the retrieving apparatuses S to perform searches in order for a single retrieval request means sequential operations of the retrieving apparatuses S, and hence the processing time may become unduly long. Therefore, when the loads on the retrieving apparatuses S are very light at a certain time, it may be effective to issue retrieval requests to a plurality of retrieving apparatuses at the same time although a certain amount of unnecessary communication and processing occurs.

In this case, retrieving requests are issued to some of, rather than all of, the retrieving apparatuses S. This is because if retrieval requests are issued to all the retrieving apparatuses S, the amount of unnecessary communication may not be reduced if the retrieving apparatus division is made by using documents as keys.

The term "the same time" as used above does not mean completely the same time in a physical sense. For example, an event that the controller 1 issues a retrieval request to a retrieving apparatus Si and then it issues another retrieval request to a retrieving apparatus Sj before receiving retrieval results from the retrieving apparatus Si can still be regarded as an event in which the retrieval requests are issued to the retrieving apparatuses Si and Sj at "the same time."

Specifically, the retrieving apparatuses S are divided into groups in descending order of hierarchical ranks and searches are performed by the retrieving apparatuses S sequentially in descending order of the hierarchical ranks of the groups. For example, assume the information retrieving apparatus includes five retrieving apparatuses S0–S4. In this case, sets of retrieving apparatuses S are formed in the following manner, for instance:

(retrieving apparatus S0, retrieving apparatus S1)

(retrieving apparatus S2, retrieving apparatus S3)

(retrieving apparatus S4).

When receiving a retrieval request, first the controller 1 issues retrieval requests to the first set of retrieving apparatuses S0 and S1. If the number of retrieval results produced by the retrieving apparatuses S0 and S1 is insufficient, the controller 1 issues retrieval requests to the second set of retrieving apparatuses S2 and S3. If the total number of retrieval results is still insufficient, the controller 1 further issues a retrieval request to the third set of retrieving apparatus S4.

When the load is a more important issue than the processing speed, the retrieving apparatuses S1, S3, and S4 may be used in the above example. This is because the retrieving apparatus S1 covers the information of the retrieving apparatus S0, and the retrieving apparatus S3 covers the information of the retrieving apparatus S2. However, in this case, the least upper bound of evaluation values to be covered by the retrieving apparatus S1 is set at t[0] rather than t[1]. Similarly, the least upper bound of evaluation values to be covered by the retrieving apparatus S3 is set at t[2] rather than t[3].

Next, a third embodiment of the present invention is described. This embodiment is intended to cause the information retrieving apparatus to operate more efficiently.

As described above, the evaluation value range of the retrieving apparatus Si is $((p-1)t[0]+t[i+1],(p-1)t[0]+t[i]]$. Even if parameter p increases, the absolute value of the subject range of the retrieving apparatus Si is fixed at $t[i]-[i+1]$. However, as the number of terms, i.e., p, increases, evaluation values as a whole increase and hence the subject range of a retrieving apparatus of a smaller number i becomes relatively narrower.

When the number p is very large, a probability that an evaluation value is within the range of the retrieving apparatus Si is very low. In view of the above, in this embodiment, a probability that a sufficient number of retrieval results are produced by a retrieving apparatus Si with a number p of terms is calculated statistically. If the calculated probability for the retrieving apparatus Si is smaller than a predetermined value, the controller 1 refrains from issuing retrieval requests to the retrieving apparatuses S0 to Si-1 when the number of terms is equal to the particular number p; retrieval requests are issued to only the retrieving apparatuses Si to SN-1. In this case, the least upper bound of evaluation values of the retrieving apparatus Si is set at $\infty$ (infinity).

Next, a fourth embodiment of the invention is described. This embodiment is intended to increase the search speed for a search request that uses the same search formula as a previous search request.

The controller 1 stores history information, i.e., information of what retrieving apparatuses S produced retrieval results in response to retrieval requests issued to the respective retrieving apparatuses S. Now assume a case that when the top 100 retrieval results are requested, retrieval results are produced in the following manner:

Retrieving apparatus S0 . . . 21 pieces

Retrieving apparatus S1 . . . 54 pieces

Retrieving apparatus S2 . . . 25 pieces.

That is, 100 retrieval results are obtained by the three highest-rank retrieving apparatuses. Thus, the controller 1 records the following history information that comprises three elements: (search formula, last retrieving apparatus number, evaluation value rank of the first retrieval result of the last retrieving apparatus).

In the above example, the search formula and the fact that the retrieval result whose evaluation value is largest in the retrieving apparatus S2 in its subject range is at the 76th rank among all the retrieval results are recorded as follows:

(search formula, 2, 76).

When later receiving a retrieval request for providing the 101st to 200th retrieval results by using the same search formula, the controller 1 issues, to the retrieving apparatus S2, a retrieval request for providing the 101st to 200th retrieval results in such a manner that the first retrieval result of the retrieving apparatus S2 is made the 76th retrieval result. Thus, the controller 1 does not issue retrieval requests to the retrieving apparatuses S0 and S1.

Next, a fifth embodiment of the invention is described. This embodiment may further increase the retrieval efficiency by recording information indicating the extent that the respective retrieving apparatuses are searched and combining this information using caching.

The caching technique is well known which increases, by using a cache device, the processing speed when a process that was executed previously is executed again. In this embodiment of the present invention, the cache technique is applied to the information retrieving method and apparatus. Although this embodiment is directed to a case where a cache device is provided in the controller 1, the cache device may be provided so as to be interposed between the controller 1 and the retrieving apparatuses S. Various types of cache devices are known such as a store-through type and a store-in type. Any of those types of cache devices may be used in this embodiment of the present invention.

In the example used in the fourth embodiment, the cache device holds the 100 retrieval results. When receiving a second retrieval request, the controller 1 outputs, as a reply, the caching contents of the cache device if it determines that the cache device caches the requested information.

In the example used in the fourth embodiment, the number of retrieval results of the retrieving apparatus S2 is 25, which means that the retrieving apparatus S2 produced at least 25 retrieval results. Because of the condition that a total of 100 retrieval results should be produced, the retrieving apparatus S2 may have stopped employing retrieval results after the number of retrieval results had reached 25.

In view of the above, in this embodiment of the present invention, when the last retrieving apparatus where a requested number of retrieval results has been satisfied has produced retrieval results that are more than the number of retrieval results the last retrieving apparatus is required to produce, all of the produced retrieval results are sent to the controller 1. Although the controller 1 causes the cache device to cache those retrieval results, it outputs only 100 retrieval results via the interface unit 2 to conform to the retrieval request as received. For example, when the retrieving apparatus S2 has actually produced 45 retrieval results, it sends all of the 45 retrieval results to the controller 1.

The controller 1 records the following information:

(search formula, 3, 121).

In this case, the retrieving apparatuses S0 to S2 have produced 120 (=21+54 45) retrieval results and their specific contents are held by the cache device. Therefore, when retrieval results of the 121st rank onward are needed, searches should be started by the retrieving apparatus S3; a retrieval result having the largest evaluation value of the retrieving apparatus S3 is at the 121st rank among all the retrieval results.

Since the capacity of the cache device has a physical limit, the cache device should be used efficiently. For example, a method may be employed in which it is checked whether the number of retrieval results produced by a retrieving apparatus is larger than a predetermined number (limit value) and an excessive part of the retrieval results are disregarded without being held by the cache device.

Another method may be employed in which the cache device is configured so as to accommodate a plurality of access speeds. For example, a high-speed cache such as a semiconductor memory and a low-speed cache such as a magnetic disk device are used, and retrieval results are distributed to those caches in accordance with their evaluation values. That is, retrieval results having large evaluation values, for which a retrieval request arrives at a high frequency, are stored in the high-speed cache whereas later produced retrieval results having relatively small evaluation results are stored in the low-speed cache.

As for discharge of data from the cache device, the time required for retrieval may be added to the factors to be considered in determining data to be discharged, instead of simply considering most recently accessed data important. Specifically, each retrieval result is given a value indicating the order of discharge from the cache device in accordance with the time required for its retrieval, and a retrieval result having a longer retrieval time are made more difficult to discharge. This is because a retrieval result that will be produced again in a short time by a new search is low in the necessity for relying on the cache device.

Furthermore, when documents as retrieval subjects are added, altered, or deleted, the information retrieving apparatus is reconstructed. When a document-based database of the information retrieving apparatus is updated for this purpose, the cache device also is cleared. However, the same retrieval requests as stored in the cache device would be received again even after the database is updated. Therefore, it is preferable that searches be performed on a new database for retrieval requests that were received when the old database was used and are now stored in the cache device after reconstruction of the information retrieving apparatus and before reception of such retrieval requests, and that new retrieval results be stored in the cache device.

Next, a sixth embodiment of the invention is described.

Figure 9:
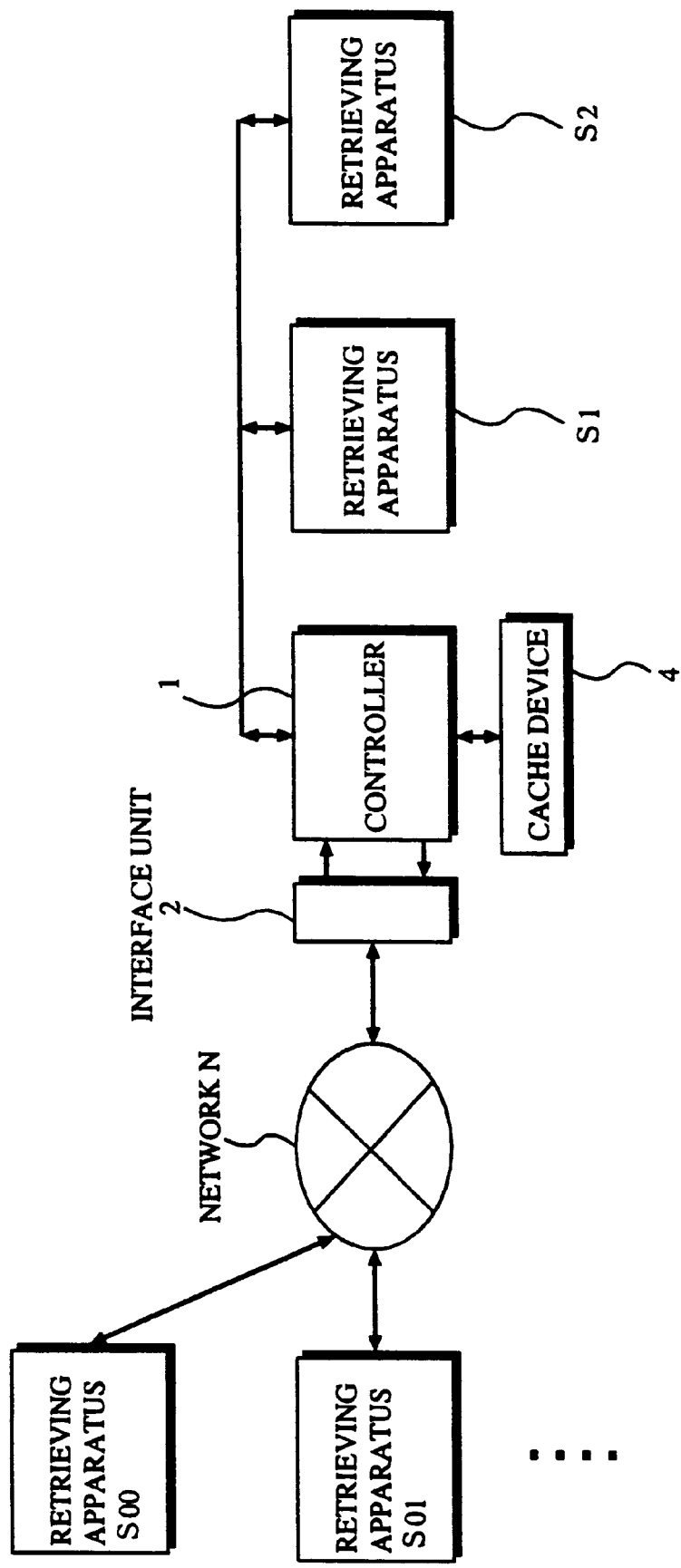
FIG. 9 shows a system configuration of an information retrieving method or apparatus according to yet another embodiment of the present invention.

FIG. 9 shows a system configuration of an information retrieving apparatus according to the sixth embodiment of the present invention. The information retrieving apparatus comprises a first plurality of retrieving apparatuses S0i (retrieving apparatus S00, S01, . . . ), a network N, an interface unit 2, a controller 1, a cache device 4, and a second plurality of retrieving apparatuses S1 through SN–1 (only S1 and S2 are shown for clarity). The group of retrieving apparatuses S0 (retrieving apparatuses S00, S01, . . . ) is connected to the controller 1 via the network N. The network N is a local area network (LAN), a wide area network (WAN), the Internet, or the like, and may be either a wired network or a wireless network. In this embodiment, the controller 1 is provided on the side of retrieving apparatuses S1 and S2. This is because if each of the retrieving apparatuses S0 of the group is provided with a controller 1, processes of the retrieving apparatuses S1 onward become complex. Although in this embodiment the network N is provided at one location, the present invention is not limited to such a case and an arbitrary number of networks may be provided between arbitrarily selected pairs of retrieving apparatuses.

Additionally, there may occur a case that the delay of the network N between a retrieving apparatus SO and the retrieving apparatus S1 is long. For example, a long delay may occur in a case where the Internet is employed as the network N and is used via a public line.

In such a case, it is not efficient to make maximum use of the data of the retrieving apparatus S0 and to issue as many retrieval requests as possible to the retrieving apparatuses S1 onward that are connected to the retrieving apparatus S0 via the network N. If a user desires this type of operation, in this embodiment, searches are performed without setting the greatest lower bound of evaluation values of the retrieving apparatus S0 and a retrieval request is issued to the retrieving apparatus S1 via the network N only when a sufficient number of retrieval results have not been produced by the retrieving apparatus S0. In this case, although the continuity of evaluation values are not satisfied between the retrieving apparatuses S0 and S1, the retrieval speed is increased.

Although the continuity is not satisfied, the sequentiality can be assured by adding a proper value (for instance, p t[0]). "The sequentiality is assured" means that the minimum evaluation value of retrieval results of a retrieving apparatus S0 that provides retrieval results first is larger than the maximum evaluation value of retrieval results of the retrieving apparatuses Si onward. Thus, searches of the retrieving apparatus S0 are performed locally and those of the retrieving apparatuses S1 onward are performed remotely. Further, the least upper bound of evaluation values of the retrieving apparatus S1 is somewhat different than used in the above described embodiment; it is changed to a condition that the weight of at least one of terms other than terms relating to NOT is t[1] or less.

When a network is involved, various kinds of users having varied interests and concerns use the information retrieving apparatus. In this situation, it is desired that a retrieving apparatus S0 at the location of a user be customized for his manner of use. That is, an offset(term A) is added in the following manner to the weight of a term that is used by the user for a search:

val(term A, document i)+offset(term A).

If the user prefers the search term A, offset(term A) is given a positive value. If he does not prefer the search term A, it is given a negative value. The retrieving apparatus S1 stores a set of offset values in the respective retrieving apparatuses S0 of the group and determines the least upper bound of evaluation values of each retrieving apparatus S0 so as to avoid providing retrieval results that have already been output from the retrieving apparatuses S0.

Although the above description is directed to the case where the network N can be a factor of determining the communication speed and is provided between the retrieving apparatuses S0 and the retrieving apparatus S1, the network N may be provided anywhere. For example, when a network N having low communication speed exists between the retrieving apparatuses S1 and S2, they serve as the retrieving apparatus S0 as described above and the retrieving apparatuses S2 onward function as the retrieving apparatuses S1 onward as described above.

Next, a seventh embodiment of the invention is described. In an information retrieving method and apparatus according to this embodiment, division among the retrieving apparatuses account for the differing loads on the respective retrieving apparatuses. The lower ends t[i] of the respective weight ranges as well as the processing abilities of the respective retrieving apparatuses are modified based on statistical load information. The processing ability is improved in the following manner, for instance:

Using high-level hardware to attain higher processing speed. Arranging in parallel a plurality of retrieving apparatuses having the same functions. Reducing the amount of documents to be covered by the receiving apparatus concerned from that of documents to be covered by other retrieving apparatuses, to make the retrieving apparatus concerned relatively faster. For example, if the value of t[1] of the retrieving apparatus S0 is increased, the range of the index table retained by the retrieving apparatus S0 is made smaller and hence the load of the retrieving apparatus S0 becomes lighter. The processing speed of the retrieving apparatus S0 is thus increased.

In this embodiment of the present invention, the following modification is possible. Although in the above embodiments the evaluation value is the sum of the weights of respective terms (except terms relating to NOT), this embodiment accommodates an arbitrary evaluation formula that monotonically increases with respect to respective terms (except terms relating to NOT). That is, any evaluation formula may be employed as long as the evaluation value increases as the weight of each term that does not relate to NOT increases.

An example is now described in which an evaluation formula is generated from a search formula by converting AND and OR to multiplication and addition, respectively. When the search formula is:

term A AND term B AND term C, the evaluation value range of a retrieving apparatus Si is:

$$(t[0]t[0]t[i+1], t[0]t[0]t[i]].$$

When the search formula is:

term A AND (term B OR term C), the evaluation value range of a retrieving apparatus Si is:

$$(t[0](t[0]+t[i+1]), t[0](t[0]+t[i])].$$

Although in the above embodiments the weight range of each term covered by each retrieving apparatus is fixed irrespective of the term, this is not problematic even if the weight range is changed from one term to another. For example, in a retrieving apparatus Si, the weight range of a term W may be set to be (t[w, i+1], t[w, i]], where $$t[w, 0]=MAX, t[w,1]>t[w, j], i<j.$$

In this case, with an additive evaluation formula, the evaluation value range to be covered by the retrieving apparatus Si is $$((p-1)t[0]+MAX\ t[w, i+1], (p-1)t[0]+MAX\ t[w, i]].$$

Further, it is effective to employ the following evaluation function:

1) A document that does not conform to a search formula is given an evaluation value $-\infty$.

First, if a document does not conform to a user's search formula, it is given an evaluation value $-\infty$.

2) Terms relating to NOT are removed from the search formula to generate a formula for determining an evaluation value.

For example, the term relating to NOT is removed from a formula (Internet AND personal computer) NOT word processor, to obtain Internet AND personal computer.

3) Cause weighted Min and weighted Max to operate on AND and OR, respectively.
Equation (1):

$$AND_i W_i = \sum_{k=0} r^k \text{Min}_j^k val(w_i, j)$$

$$OR_i W_i = \sum_{k=0} r^k \text{Max}_j^k val(w_i, j)$$

where $\text{Min}_j^k val(w_i, j)$ means a kth smallest one of $val(w_i, j)$ and similarly, $\text{Max}_j^k (w_i, j)$ means a kth greatest one of $val(w_i, j)$, and $0 \leq r \leq 1$.

After the evaluation formula is determined according to Equations (1), the search range is determined in the following manner:

1) Weight ranges to be covered by respective index tables.

When there are n hierarchical levels, the range to be covered by an index table of level i is set to be (t[i+1], t[i]]. This corresponds to a case of a single term.

2) How to determine a range to be covered.

Assuming that there are k terms relating to AND or OR and that the ranges to be covered of those terms are (x0, y0], (x1, y1], ... in descending order of weights, the range to be covered of the k terms as a whole is
Equation (2):

$$\left[ \sum_i^{k-1} r^i x_i, \sum_i^{k-1} r^i y_i \right]$$

For example, assume the following search formula:
a OR (b AND c) OR (d AND e AND f NOT g).

First, removing the term relating NOT, the following formula is obtained:
a OR (b AND c) OR (d AND e AND f).

The ranges to be covered of the respective terms relating to OR in level i are set such that
Equation (3):

| | |
|---|---|
| a | :(ti+1,ti] |
| b AND c | :((1 + r)ti+1, (1 + r)ti] |
| d AND e AND f | :((1 + r + r2)ti+1, (1 + r + r2)ti] |
| a OR (b AND c) OR (d AND e AND f) | :((1 + r + r2 + (1 + r)r + r2)ti+1, (1 + r + r2 +(1 + r)r +r2)ti] |

The present invention is not limited to the above-described embodiments and various modifications are possible within the technical scope of the invention. For example, one retrieving apparatus is not limited to a single, physical computer and may be one process that runs on an arbitrary number of computers. A typical example is a situation that a process(es) corresponding to the retrieving apparatuses S0–SN-1 run on a single, physical computer. In this case, one process may correspond to each retrieving apparatus or one process may emulate another retrieving apparatus by changing a parameter.

While the present invention has been described in detail and with reference to specific embodiments thereof, it will be apparent to one skilled in the art that various changes and modifications can be made therein without departing from the spirit and scope thereof.

What is claimed is:

1. An information retrieving method for performing a prescribed search by using a plurality of retrieving apparatuses, comprising the steps of:

dividing a database, according to weight values given to respective prescribed terms of the database, into hierarchical search ranges in which the respective retrieving apparatuses are to perform searches on the database;

supplying a prescribed retrieval request as a first retrieval request including a first desired number of retrieval outputs to a first retrieving apparatus;

determining whether a number of first retrieval result output by the first retrieving apparatus satisfies the first retrieval request; and supplying a second retrieving apparatus with a second retrieval request including a second desired number of retrieval outputs equal to the first desired number of retrieval outputs minus the number of the first retrieval results, when it is determined that the first retrieval results do not satisfy the first retrieval request.

2. An information retrieving apparatus for performing a prescribed search of a database using a plurality of retrieving apparatuses, wherein search ranges in which the respective retrieving apparatuses are to perform searches on the database are divided in order of weight values given to respective prescribed terms of the database, the information retrieving apparatus comprising:

means for supplying a prescribed retrieval request as a first retrieval request to a first one of the plurality of retrieving apparatuses;

means for determining whether a first retrieval result produced by the first one of the plurality of retrieving apparatuses satisfies the first retrieval request; and means for supplying, if the determining means determines that the first retrieval result does not satisfy the first retrieval request, a second one of the plurality of retrieving apparatuses with a difference between the first retrieval request and the first retrieval result as a second retrieval request.

3. An information retrieving method for performing a prescribed search by using a plurality of retrieving apparatuses, wherein search ranges in which the respective retrieving apparatuses are to perform searches on a database are divided in order to weight values given to respective prescribed terms of the database, the information retrieving apparatus comprising:

first means for determining, from among the plurality of retrieving apparatuses, a first retrieving apparatus to which the prescribed retrieval request should be supplied as a first retrieval request upon reception of a prescribed retrieval request;

second means for determining whether a first retrieval result that is produced by the determined first retrieving apparatus in response to the first retrieval request satisfies the first retrieval request; and third means for determining, if the second determining means determines that the first retrieval result does not satisfy the first retrieval request, a second retrieval request to be supplied to a second retrieving apparatus based on the first retrieval request and the first retrieval result, said second retrieval request being different from said first retrieval request.

4. An information retrieving apparatus for performing a prescribed search of a database, the information retrieving apparatus comprising:

a plurality of retrieving apparatuses, each retrieving apparatus being associated with a corresponding one of a plurality of hierarchical search ranges divided in order of weight values given to respective prescribed terms of the database; and a controller coupled to the plurality of retrieving apparatuses for supplying a prescribed retrieval request as a first retrieval request to a first one of the plurality of retrieving apparatuses, for determining whether a first retrieval result produced by the first retrieving apparatus satisfies the first retrieval request, and for supplying a second one of the plurality of retrieving apparatuses with a difference between the first retrieval request and the first retrieval result as a second retrieval request when the first retrieval result does not satisfy the first retrieval request.

5. An information retrieving apparatus for performing a prescribed search of a database by using a plurality of retrieving apparatuses, wherein search ranges in which the respective retrieving apparatuses are to perform searches on a database are divided in order to weight values given to respective prescribed terms of the database, the information retrieving apparatus comprising:

a first controller coupled to the plurality of receiving apparatuses for determining a first retrieving apparatus to which the prescribed retrieval request is supplied as a first retrieval request in response to a prescribed retrieval request;

a second controller coupled to the plurality of receiving apparatuses for determining whether a first retrieval result received from the determined first retrieving apparatus in response to the first retrieval request satisfies the first retrieval request; and a third controller coupled to the plurality of receiving apparatuses for determining, when the second controller determines that the first retrieval result does not satisfy the first retrieval request, a second retrieval request for application to a second retrieving apparatus based on the first retrieval request and the first retrieval result, said second retrieval request being different from said first retrieval request.

6. An information retrieving method for performing a prescribed search, comprising the steps of:

dividing a database into a plurality of hierarchical search ranges for searching the database;

searching the database using a first one of the plurality of hierarchical search ranges in response to a prescribed retrieval request as a first retrieval request, including a first desired number of retrieval outputs;

determining whether the searching of the database produces a first retrieval result that satisfies the first retrieval request; and searching the database using a second one of the plurality of hierarchical search ranges in response to a second retrieval request including a second desired number of retrieval outputs equal to the first desired number of retrieval outputs minus the number of the first retrieval results when it is determined that the first result does not satisfy the first retrieval request.

7. The information retrieving method of claim 6 wherein the hierarchical search ranges are according to weight values given to respective terms of the database.

8. An information retrieving apparatus for performing a prescribed search by using a retrieving apparatus, wherein search ranges in which the retrieving apparatus is to perform searches on a database are divided into a plurality of hierarchical search ranges according to respective prescribed terms of the database, the information retrieving apparatus comprising:

a first controller coupled to the retrieving apparatus for supplying a prescribed retrieval request corresponding to a first one of the plurality of hierarchical search ranges as a first retrieval request to the retrieving apparatus for searching the database;

a second controller coupled to the retrieving apparatus for determining whether a first retrieval result produced by the retrieving apparatus satisfies the first retrieval request; and a third controller coupled to the retrieving apparatus for supplying the retrieving apparatus with a second retrieval request corresponding to a second one of the plurality of hierarchical search ranges and to a difference between the first retrieval request and the first retrieval result when the second controller determines that the first retrieval result does not satisfy the first retrieval request.

9. An information retrieving apparatus for performing a prescribed search by using a retrieving apparatus, wherein search ranges in which the retrieving apparatus is to perform searches on a database are divided into a plurality of hierarchical search ranges according to weight values assigned to respective terms of the database, the information retrieving apparatus comprising:

means for supplying a first retrieval request to the retrieving apparatus, upon reception of a prescribed retrieval request, the first retrieval request being indicative of the prescribed retrieval request and one of the plurality of hierarchical search ranges;

first means for determining whether a first retrieval result received from the retrieving apparatus in response to the first retrieval request satisfies the first retrieval request; and second means for determining a second retrieval request for application to the retrieving apparatus when the first retrieval result does not satisfy the first retrieval request, the second retrieval request being indicative of the first retrieval request and the first retrieval result and of a second one of the hierarchical search ranges, the second hierarchical search range including the first hierarchical search range.

* * * * *